(12) United States Patent
Schmidt

(10) Patent No.: US 8,521,242 B2
(45) Date of Patent: Aug. 27, 2013

(54) SUPERCONDUCTING CABLE

(75) Inventor: Frank Schmidt, Hannover (DE)

(73) Assignee: NEXANS, Paris (FR)

(*) Notice: Subject to any disclaimer, the term of this patent is extended or adjusted under 35 U.S.C. 154(b) by 30 days.

(21) Appl. No.: 12/952,587

(22) Filed: Nov. 23, 2010

(65) Prior Publication Data

US 2011/0152105 A1 Jun. 23, 2011

(30) Foreign Application Priority Data

Nov. 30, 2009 (EP) .................................. 09306154

(51) Int. Cl.
*H01L 39/14* (2006.01)

(52) U.S. Cl.
USPC ....................................................... 505/231

(58) Field of Classification Search
USPC .............. 505/230, 231, 704, 886; 174/125.1
See application file for complete search history.

(56) References Cited

U.S. PATENT DOCUMENTS

| | | | |
|---|---|---|---|
| 6,005,194 A | 12/1999 | Ries | |
| 6,633,003 B2 * | 10/2003 | Nassi et al. | 174/125.1 |
| 6,743,984 B2 * | 6/2004 | Nassi et al. | 174/125.1 |
| 6,794,579 B1 * | 9/2004 | Caracino et al. | 174/125.1 |
| 6,835,892 B2 * | 12/2004 | Nassi et al. | 174/125.1 |
| 6,844,490 B2 * | 1/2005 | Nassi et al. | 174/15.5 |
| 6,985,761 B2 * | 1/2006 | Mele | 505/231 |
| 7,237,317 B2 * | 7/2007 | Schippl | 29/599 |
| 7,608,785 B2 * | 10/2009 | Reis | 174/125.1 |
| 8,112,135 B2 * | 2/2012 | Allais et al. | 505/230 |

FOREIGN PATENT DOCUMENTS

DE 19724618 12/1998

* cited by examiner

*Primary Examiner* — Colleen Dunn
(74) *Attorney, Agent, or Firm* — Sofer & Haroun, LLP

(57) ABSTRACT

A superconductive cable with a central superconductive conductor (1), a surrounding dielectric (3) and a surrounding superconductive return conductor (4). The central conductor (1) is formed from a single ribbon carrying superconductive material into a tube with a longitudinal extending slot (2) with the two edges of the ribbon abutting to each other. A ribbon (14) made of semiconductive material is wound around the central conductor (1) with at least one layer.

5 Claims, 1 Drawing Sheet

SUPERCONDUCTING CABLE

RELATED APPLICATION

This application claims the benefit of priority from European Patent Application No. 09 306 154.7, filed on Nov. 30, 2009, the entirety of which is incorporated by reference.

BACKGROUND

1. Field of the Invention

The invention relates to a superconducting cable which has a central superconducting electrical conductor, a dielectric which surrounds the same and a superconducting return conductor which is arranged above the same.

2. Description of Related Art

A cable such as this is disclosed in EP 0 830 694 B1.

In modern technology, a superconducting cable has electrical conductors composed of a composite material which contains ceramic material that changes to the superconducting state at sufficiently low temperatures. The electrical direct-current resistance of a correspondingly constructed conductor is zero, if the coolant is adequate, provided that a specific current level is not exceeded. By way of example, suitable ceramic materials are materials doped with rare earths, which have become known by the name ReBCO (rare-earth barium-copper oxide), in particular including YBCO (yttrium-barium-copper oxide). Another of these superconducting materials is, for example, BSCCO (bismuth-strontium-calcium-copper oxide). Sufficiently low temperatures to change a material such as this to the superconducting state are, for example, between 67 K and 110 K. Suitable coolants are, for example, nitrogen, helium, neon and hydrogen, or mixtures of these substances.

DE 197 24 618 A1 describes a superconductor which consists of a corrugated metal tube, which is welded with a longitudinal bead and has a superconducting layer based on ceramic materials. The wall of the superconductor consists of a metallic support on which a metal foil, to which the superconducting layer is fitted, is applied by means of an adhesion promoter.

The initial cited EP 0 830 694 B1 discloses a superconducting alternating-current cable having a forward conductor and a return conductor, which is arranged concentrically with respect thereto. Both conductors are in the form of conductor arrangements composed of a plurality of conductor layers. In order to produce the forward conductor, a plurality of layers of superconducting individual conductors are wound at predetermined angles around a cylindrical support. A dielectric of sufficient radial size is applied to the finished forward conductor, around which the return conductor is arranged, by winding on a plurality of layers of superconducting individual conductors. The production of this known cable is complex. With corresponding use of material, it has relatively large radial dimensions which also require a correspondingly large cryostat, in which the cable is arranged for operation as a superconducting cable, and through which the coolant is passed.

OBJECTS AND SUMMARY

The invention is based on the object of developing the cable described initially such that it can be produced more easily, with a simpler design.

This object is accordingly achieved by the central conductor being formed in a manner known per se from a ribbon, which is fitted with a superconducting material, running longitudinally with respect to a tube having a slot which runs in the axial direction, on which the two edges of the ribbon rest on one another, and in that at least one layer of a ribbon of semiconductive material is wound around the central conductor.

In this cable, the central conductor, which can be considered to be a superconducting forward conductor, consists of a single-layer tube which is formed, running longitudinally, from a ribbon to which the superconducting material is fitted. The tube is intrinsically sufficiently robust that no separate support is required for the central conductor. This itself consists only of one layer, which is governed by the thickness of the ribbon, thus allowing its radial dimensions to be kept small. This has an advantageous effect on the radial dimensions of the dielectric, which can be made smaller overall in comparison to known cables. The ribbon which surrounds the conductor and is composed of semiconductive material makes the conductor robust and avoids dielectric problems which could occur as a result of the edges that exist adjacent to the slot of the conductor. Including the return conductor, this results overall in a compact superconducting cable with relatively small radial dimensions, and correspondingly using less material. The dimensions of the cryostat which holds the cable can advantageously likewise be kept smaller than normal.

The return conductor can advantageously likewise be formed from a longitudinally running, ribbon, fitted with superconducting material, to form a single-layer tube. When the same is in the form of a closed tube, as a result of the welding of the slot running in the longitudinal direction, this achieves a further advantage of effective separation of the dielectric from coolant which is moving in the cryostat outside the return conductor. The pressure of an impregnation agent which is provided in the dielectric can thus be kept constant in a simple manner—independently of the pressure of the coolant—as a result of which the dielectric characteristics of the dielectric also remain constant.

ReBCO is preferably used as the superconducting material for the ribbon from which the central conductor and if possible a return conductor as well, are formed. It is particularly advantageous to use YBCO as one of these superconducting materials.

BRIEF DESCRIPTION OF THE DRAWINGS

Exemplary embodiments of the subject matter of the invention are illustrated in the drawings, in which.

DETAILED DESCRIPTION

Figure 1:
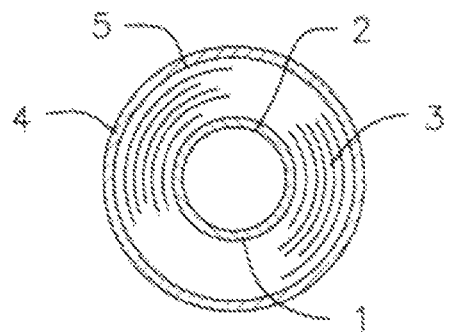
FIG. 1 shows a cross-sectional illustration of a superconducting cable according to the invention.
Figure 4:
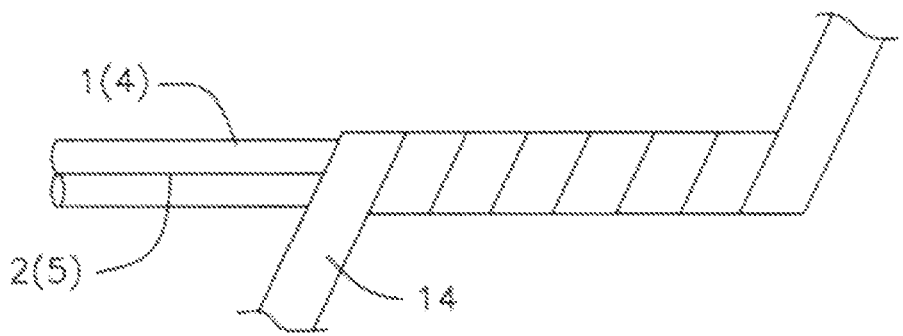
FIG. 4 shows an embodiment of the conductor, modified from that shown in FIGS. 2 and 3.

The superconducting cable illustrated in the form of a section in FIG. 1 has a central conductor (forward conductor) 1 in the form of a single-layer tube. The conductor 1 is formed from a longitudinal running ribbon of predetermined width, which is fitted with superconducting material, to form a tube with a slot 2 which runs in the longitudinal direction and on which the two edges of the ribbon rest on one another. ReBCO is preferably used, and particularly advantageously YRCO, as the superconducting material. In order to make it robust, the conductor 1 is surrounded by a ribbon 14, which can be seen in FIG. 4, composed of semiconductive material, at least one layer of which is wound around the conductor 1. The ribbon 14 is not shown in FIG. 1, for the sake of clarity.

Figure 2:
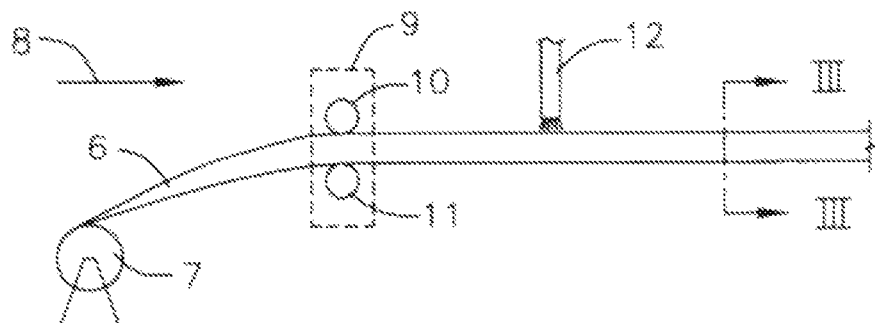
FIG. 2 shows, schematically, an arrangement for production of a conductor of the cable shown in FIG. 1.
Figure 3:
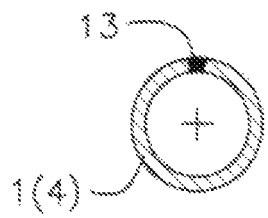
FIG. 3 shows a section through FIG. 2 along the line III-III, illustrated enlarged.

A dielectric 3 which is known per se and is surrounded by a superconducting return conductor 4 is arranged over the conductor 1, or over the ribbon 14 which is wound around it. The return conductor 4 may itself be designed as required. However, it is likewise advantageously in the form of a single-layer tube which is fitted with superconducting material and is formed such that it runs longitudinally with respect to a tube on whose slot 5, which runs in the longitudinal direction, the two edges of the ribbon rest on one another. The same superconducting materials as for the conductor 1 are advantageously used for the return conductor 4. The slot 5 in the return conductor 4 can advantageously be closed by welding, thus creating a closed tube. A tube such as this and as shown in FIG. 2 is produced, for example, as follows:

A ribbon 6 of predetermined width and fitted with superconducting material is drawn off from a spool 7 and is passed through a forming device 9 in the direction of the arrow 8, which forming device 9 is indicated schematically by two rollers 10 and 11. A tube with a slot running in the longitudinal direction is formed in the forming device, on which slot the two edges of the ribbon 6 rest on one another. The slot is closed in a welding unit 12 which follows in the pulling-off direction. This then results in a tube, as illustrated in FIG. 3, as the return conductor 4, which is closed by a weld bead 13.

A pressurized impregnation agent may be provided in the dielectric 3, using normal technology. The coolant, which is passed under pressure through the surrounding cryostat, can be used for this purpose, likewise using normal technology, with corresponding design of the return conductor 4. A pressure drop of the coolant or impregnation agent can adversely affect the dielectric characteristics of the dielectric 3 thus resulting in a flashover, destroying the same, between the conductor 1 and the return conductor 4. If the return conductor 4 is designed in the described manner as a closed tube for the superconducting cable as shown in FIG. 1, the dielectric 3 is closed on the outside. It is then possible to use an impregnation agent which is at a constant pressure, independently of the outer coolant, as a result of which the dielectric characteristics of the dielectric remain constant.

The invention claimed is:

1. A superconducting cable comprising:
   a central superconducting electrical conductor;
   a dielectric which surrounds said central conductor; and
   a superconductive return conductor which is arranged above said dielectric,
   wherein said central conductor is formed from a ribbon fitted with a superconductive material into an intrinsically stable tube having a slot which runs in the axial direction and at which the two edges of said ribbon abut to each other and wherein at least one additional layer of a ribbon of semiconductive material is wound around the central superconductive conductor, wherein said additional layer of a ribbon of semiconductive material is configured such that it protects the dielectric which surrounds the central superconductive conductor against damages from the edges and reduces dielectric problems that occur at said edges of said ribbon fitted with a superconducting material that rest on one another.

2. A cable according to claim 1, wherein said return conductor is also formed from a ribbon fitted with a superconducting material running longitudinally with respect to a tube having a slot which runs in the axial direction, on which the two edges of said ribbon rest on one another.

3. A cable according to claim 2, wherein the slot in the return conductor is closed by welding.

4. A cable according to claim 1, wherein ReBCO is used as the superconducting material.

5. A cable according to claim 4, wherein YBCO is used as the superconducting material.

\* \* \* \* \*